Jan. 11, 1966  W. J. WITTENBERG  3,228,676

VEHICLE BODY CLOSURE LATCH

Filed Aug. 12, 1963  3 Sheets-Sheet 1

INVENTOR.
William J. Wittenberg
BY
W. S. Pettigrew
ATTORNEY

Jan. 11, 1966 W. J. WITTENBERG 3,228,676
VEHICLE BODY CLOSURE LATCH
Filed Aug. 12, 1963 3 Sheets-Sheet 2
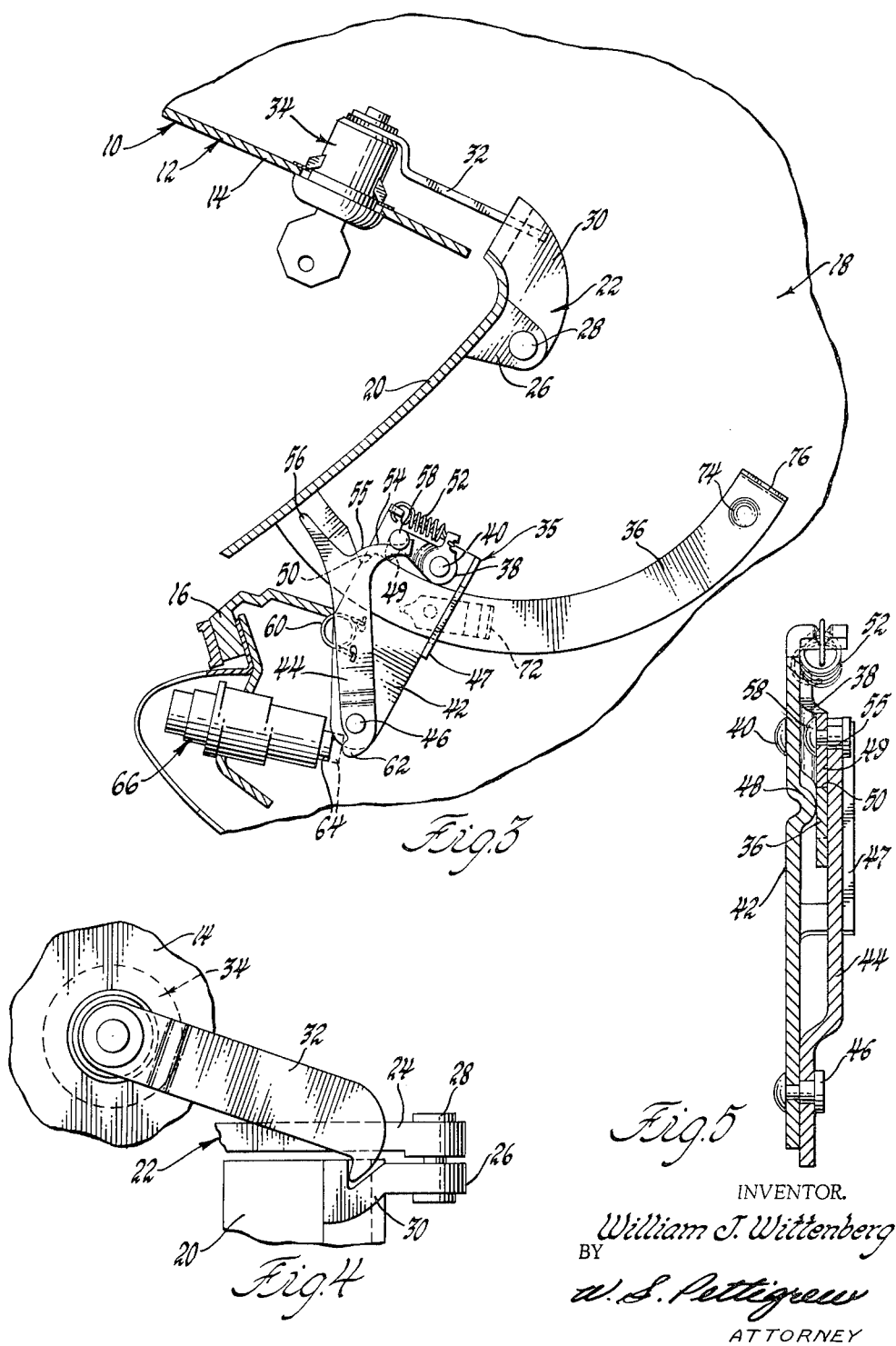
INVENTOR.
William J. Wittenberg
BY
W. S. Pettigrew
ATTORNEY

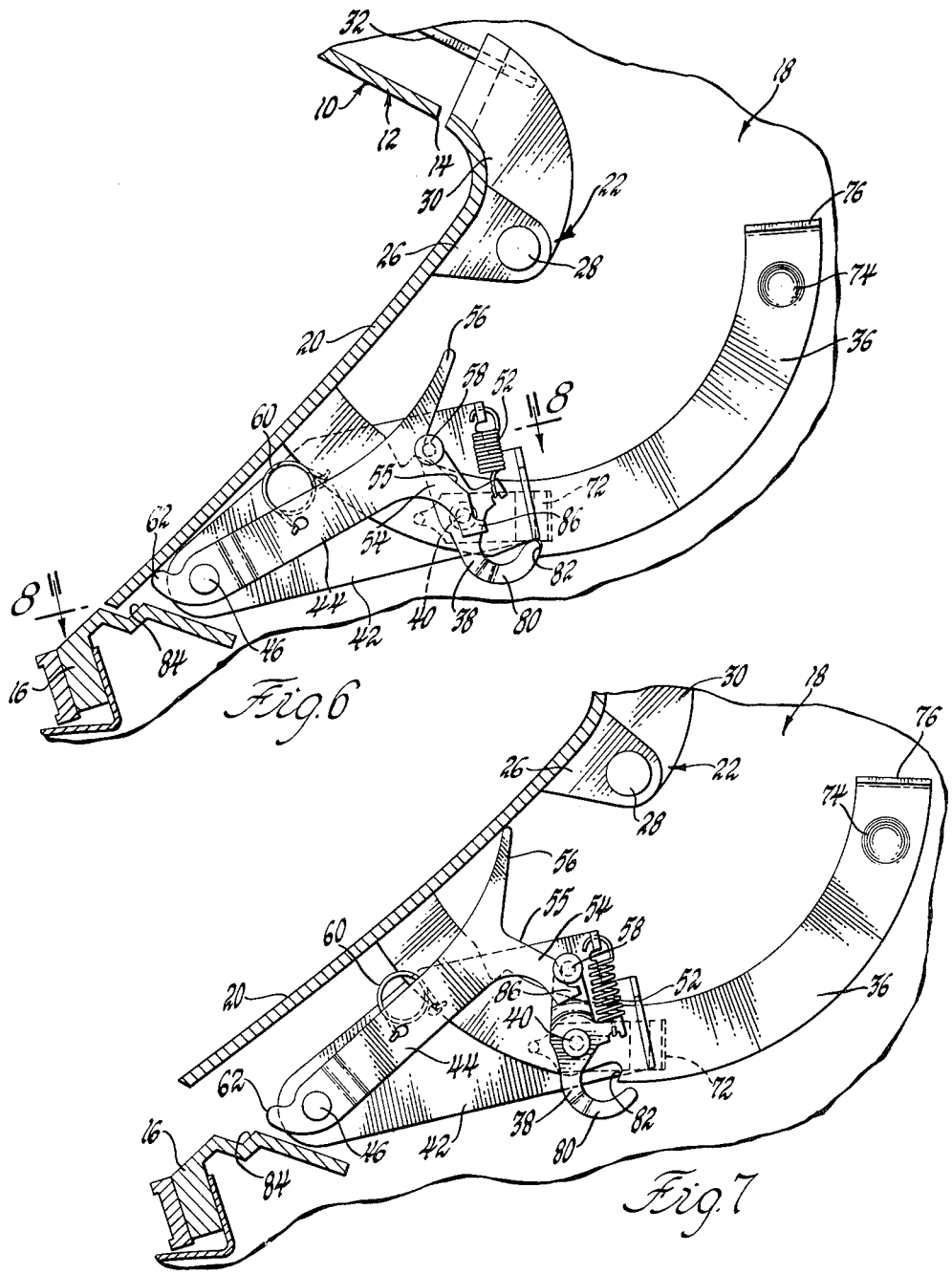

United States Patent Office 3,228,676
Patented Jan. 11, 1966

3,228,676
VEHICLE BODY CLOSURE LATCH
William J. Wittenberg, Royal Oak, Mich., assignor to General Motors Corporation, Detroit, Mich., a corporation of Delaware
Filed Aug. 12, 1963, Ser. No. 301,568
2 Claims. (Cl. 268—72)

This invention relates to closure latches and more particularly to vehicle body closure latches.

One feature of this invention is that it provides a new and improved vehicle body closure latch. Another feature of this invention is that it provides a new and improved vehicle body closure latch and kick-open including holding means engageable with the closure to hold it in closed position and actuating means succesively engageable with the holding means and the closure to first release the holding means from the closure and then move the closure from closed to open positions. A further feature of this invention is that it provides a new and improved vehicle body closure latch including an actuating member having a first portion operable to release closure holding means and a second portion engageable with the closure to move it from closed to open positions upon release of the holding means, and means for yieldably maintaining the second portion in engagement with the closure to hold the closure in open position. Still another feature of this invention is that it provides a touch-operated vehicle body closure latch.

These and other features and advantages of the closure latch of this invention will be readily apparent from the following specification and drawings wherein:

FIGURE 3 is a view similar to FIGURE 2 showing the closure in an open position;

FIGURE 4 is an enlarged view taken generally along the plane indicated by line 4—4 of FIGURE 2;

FIGURE 5 is an enlarged sectional view generally taken along the plane indicated by line 5—5 of FIGURE 2;

FIGURE 6 is a view similar to FIGURE 2 illustrating another embodiment of a closure latch according to this invention;

FIGURE 7 is a view similar to FIGURE 6 showing the closure in an open position; and FIGURE 8 is a sectional view taken generally along the line 8—8 of FIGURE 6.

Figure 1:
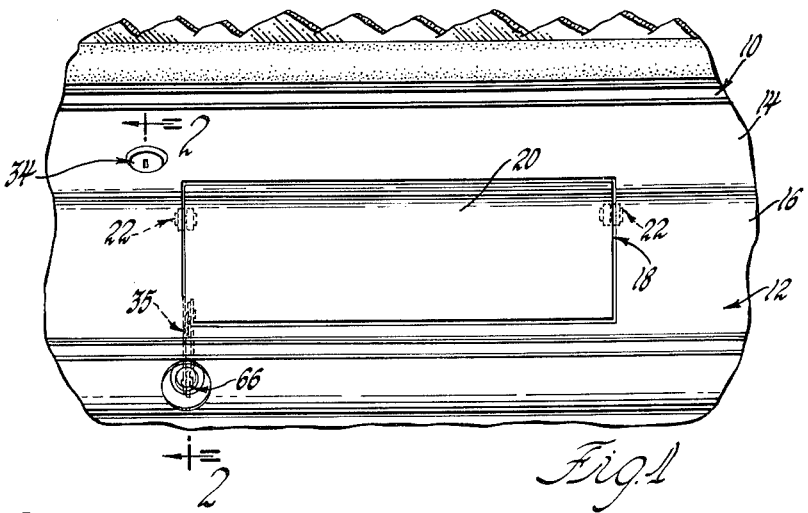
FIGURE 1 is a fragmentary elevational view of a portion of a vehicle body including a closure and embodying a closure latch according to this invention.

Referring now particularly to FIGURES 1 through 5 of the drawings, one embodiment of the closure latch will be described. A vehicle body 10 includes an instrument panel structure 12 having a generally upwardly and forwardly extending panel 14 merging with a generally downwardly and forwardly extending panel 16. A glove compartment 18 is provided interiorly of panels 14 and 16 and a closure or compartment door 20 is swingably mounted adjacent its upper edge on the instrument panel for generally upward and outward movement between a closed position flush with panel 16, and a fully open position, not shown, adjacent panel 14.

As shown best in FIGURES 1 and 4, a pair of like hinge assemblies 22 for swingably mounting door 20 on panel 12 each includes a hinge arm 24 mounted on panel 16, a hinge arm 26 fixed to door 20 and a hinge pin 28 pivotally interconnecting the two. An upwardly extending V-shaped striker portion 30 of arm 26 of the left hand hinge assembly receives the hooked end of a pawl 32 to lock door 20 in closed position. Pawl 32 is secured to a lock cylinder 34 which is mounted on panel 14.

Latch means 35 for releasably holding door 20 in closed position generally include a holding member or keeper 36 mounted on door 20 and extending generally concentrically of hinge axis 28, a holding means or bolt 38 pivotally mounted at 40 on a bracket 42, and an actuating member 44 pivotally mounted at 46 on bracket 42. As indicated in FIGURE 1, the latch means are mounted on panel 12 to the left of door 20 and compartment 18.

As shown best in FIGURE 5, keeper 36 is guided within a slot of a lateral flange 47 of bracket 42 and between a rib 48 of the bracket and member 44. Bolt 38 includes an offset hooked end or foot 49 located in the plane of movement of the keeper. A coil tension spring 52 hooked between a leg of the bolt and a lateral tab of bracket 42 biases the bolt counterclockwise as viewed in FIGURE 2 so that the foot 49 of the bolt rides on the upper edge of the keeper during movement of the door 20 and engages a keeper notch 50 thereof to releasably hold the door in closed position.

Figure 2:
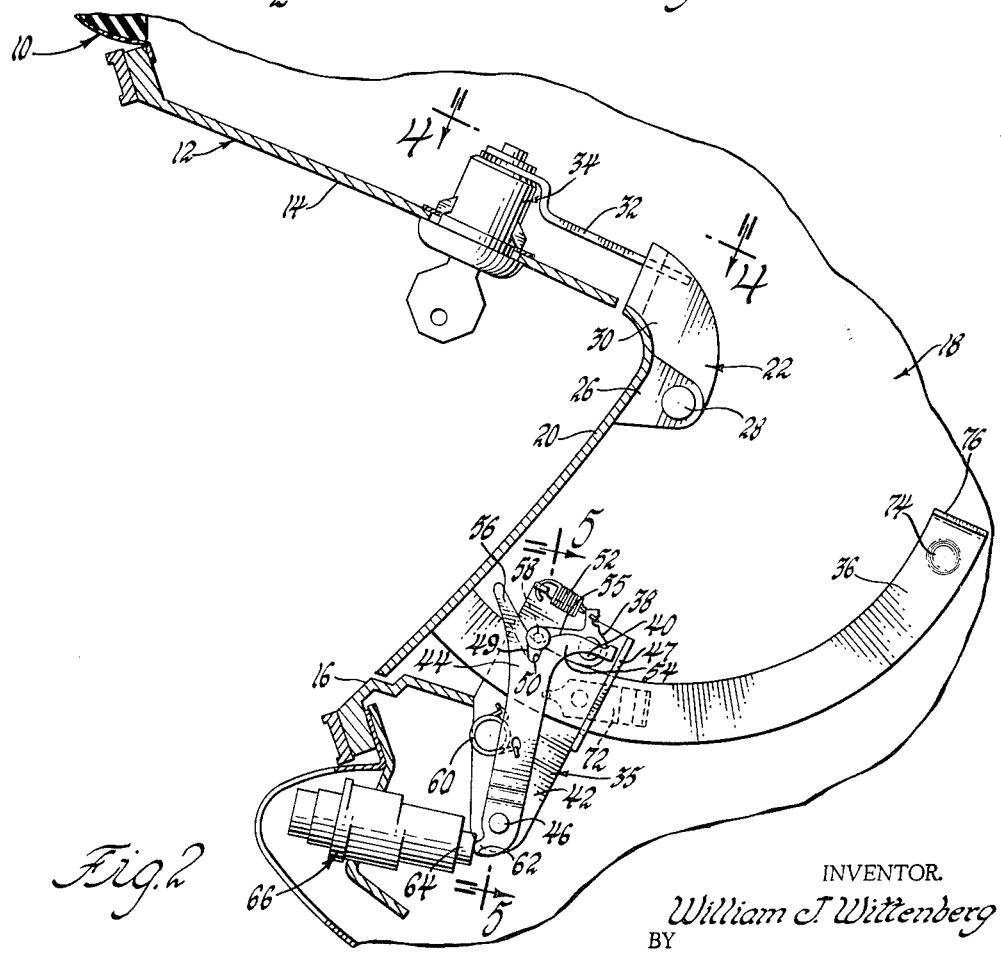
FIGURE 2 is an enlarged sectional view taken generally along the plane indicated by line 2—2 of FIGURE 1 showing the closure in closed position and illustrating one embodiment of a closure latch according to this invention.

Referring now to FIGURES 2 and 3, member 44 includes an upper forked portion having a forwardly extending leg 54 and a rearwardly extending leg 56 located adjacent door 20 in the closed position thereof. A laterally extending headed pin 58 on bolt 38 engages a camming edge 55 of leg 54 under the action of spring 52 and is located at the low point thereof at the juncture of legs 54 and 56 when foot 49 engages within notch 50. An overcenter spring 60 hooked between bracket 42 and member 44 biases member 44 clockwise, as shown in FIGURE 2, to hold a lower actuating foot 62 of the member in engagement with an axially inwardly movable plug 64 of a conventional push button mechanism 66 mounted in panel 16.

To unlatch door 20, push button 66 is depressed to rotate member 44 counterclockwise from its normal or inoperative position of FIGURE 2 toward its operative position of FIGURE 3. As member 44 initially moves counterclockwise, the cam edge 55 of the member cams pin 58 upwardly to swing bolt 38 clockwise against the action of spring 52 and move the foot 49 of the bolt out of engagement with the keeper notch 50. Upon continued counterclockwise swinging movement of member 44, spring 60 moves overcenter and causes the leg 56 of member 44 to engage door 20 and kick or move the door to its open position shown in FIGURE 3. The spring 60 maintains the door in this position so that the operator may insert his fingers under the lower edge of the door and thereafter lift it to its fully open position adjacent panel 14. A spring clip 72 mounted on bracket 42 engages a lateral dimple 74 on the free end of keeper 36 to yieldably hold door 20 in its fully open position for convenient access to compartment 18, and a lateral terminal flange 76 of the keeper is engageable with bracket flange 47 to provide a door stop.

Member 44 remains in its operative position until door 20 is moved toward closed position and engages the leg 56 of the member to move it to its inoperative position and move spring 60 overcenter to locate member 44 and bolt 38 in their positions shown in FIGURE 2.

Referring now to FIGURES 6 through 8 of the drawings, another embodiment of a closure latch according to this invention having a touch-operating feature will be described, and like numerals will be used for like parts.

In this embodiment of the invention, the bracket 42 carrying the latch parts is mounted on the dashboard 12 in a manner to locate the lower actuating foot 62 of member 44 in engagement with door 20 when the door is in closed position, as shown in FIGURE 6. The bolt 38 is provided with a lower hooked end or foot 80 engageable within a keeper notch 82 provided in the lower edge of keeper 36.

To operate the latch, the operator applies pressure against door 20 adjacent the lower edge thereof to move it inwardly from its closed position toward a shoulder portion 84 of the dashboard, so that member 44 is rotated counterclockwise and overcenter from the position of FIGURE 6 toward the position of FIGURE 7. Hooked end 80 is thereby removed from notch 82, and when the operator releases pressure from door 20 the member 44 will complete its overcenter movement to move the door to the partially open position of FIGURE 7. Pin 58 and a shoulder 86 on leg 54 engage to prevent further movement of member 44 as the operator lifts the door to its fully open position adjacent panel 14. The spring clip 72 and the keeper dimple 74 provide a door hold-open, and the lateral keeper flange 76 provides a door stop, as in the previous embodiment. Movement of door 20 from fully open to closed position will return the latch parts to their original inoperative position in the manner previously described in conjunction with the first embodiment, and are thereupon made ready for repeated touch-operation.

Thus a new and improved closure latch is provided.

I claim:

1. In a vehicle body including a closure mounted thereon for movement between open and closed positions, a closure touch-latch and kick-open comprising, a keeper mounted on said closure for movement therewith, a bolt movably mounted on said body and engageable with said keeper in the closed position of said closure to hold said closure therein, means biasing said bolt into engagement with said keeper, an actuating lever pivoted intermediate its ends on said body for movement between operative and inoperative positions and including a forked portion at one end thereof, one leg of said forked portion being engageable with said bolt and the other leg of said forked portion lying adjacent said closure member in the closed position thereof, said actuating lever including a third portion spaced from said forked portion and being located adjacent said closure when in the closed position thereof to be engageable therewith upon inward movement of said closure from the closed position thereof to move said actuating lever in a direction from the inoperative position thereof to an intermediate position thereof, said movement of said actuating lever to said intermediate position thereof engaging said one leg with said bolt to release said bolt from said keeper, and overcenter resilient means operative upon movement of said actuating lever to said intermediate position thereof and release of said bolt to bias said actuating lever and continue movement thereof in said direction and into said operative position thereof engaging said other leg with said closure to move said closure from the closed to the open position thereof, said resilient means being operable to move said actuating lever to said operative position thereof and hold said closure in the open position thereof.

2. In a vehicle body, the combination comprising, a closure mounted on said body for movement between open and closed positions, a keeper mounted on said closure to one side thereof, a hooked end bolt pivotally mounted on said body for movement between latched and reelased positions, said bolt in the latched position thereof engaging said keeper in the closed position of said closure to hold said closure therein, means biasing said bolt to the latched position thereof, an actuating lever located in a plane juxtaposed to said bolt and being pivoted adjacent one end thereof on said body member for movement relative to said bolt between operative and inoperative positions, said actuating lever including a forked portion at one end thereof, one leg of said forked portion in the inoperative position of said actuating lever being located adjacent said closure member when in the closed position thereof, an upper edge portion of said forked portion providing a cam surface adapted to be operable upon said bolt during said movement of said actuating lever relative to said bolt, cooperative means extending from said bolt into the plane of said actuating lever to embrace said upper edge portion and engage said cam surface, means for moving said actuating lever from the inoperative position thereof to an intermediate position thereof and causing said cam surface to cam said cooperative means and pivot said bolt to the release position thereof, a second surface on said upper edge portion engageable with said cooperative means for retaining said bolt in the released position thereof during movement of said actuating lever from the intermediate to the operative position thereof, and overcenter spring means connected to said actuating lever remote from the pivot thereof and operable to bias said actuating lever from the intermediate to the operative position thereof to engage said one leg with said closure to move said closure to a partially open position, said spring means being operable to hold said actuating lever in the operative position thereof to hold said closure in the partially open position thereof.

References Cited by the Examiner
UNITED STATES PATENTS

| | | |
|---|---|---|
| 845,750 | 3/1907 | Bremken. |
| 1,755,392 | 4/1930 | Hagstrom et al. |
| 2,221,095 | 11/1940 | Jacobi. |
| 2,441,678 | 5/1948 | Tietje. |
| 2,606,772 | 8/1952 | Mead et al. |

HARRISON R. MOSELEY, *Primary Examiner.*

REINALDO P. MACHADO, CHARLES E. O'CONNELL, *Examiners.*